(12) United States Patent
Yang et al.

(10) Patent No.: US 11,114,060 B2
(45) Date of Patent: Sep. 7, 2021

(54) CURSOR IMAGE DETECTION COMPARISON AND FEEDBACK STATUS DETERMINATION METHOD

(71) Applicant: ADLINK TECHNOLOGY INC., New Taipei (TW)

(72) Inventors: Chao-Tung Yang, New Taipei (TW);
Wei-Hung Chen, New Taipei (TW);
Shih-Hsun Lin, New Taipei (TW);
Wei-Jyun Tu, New Taipei (TW);
Chun-Hong Liu, New Taipei (TW);
Chien-Chung Lin, New Taipei (TW);
Chieh-Yuan Lo, New Taipei (TW);
Hsiao-Ling Chang, New Taipei (TW)

(73) Assignee: ADLINK TECHNOLOGY INC., New Taipei (TW)

( * ) Notice: Subject to any disclaimer, the term of this patent is extended or adjusted under 35 U.S.C. 154(b) by 111 days.

(21) Appl. No.: 16/536,009

(22) Filed: Aug. 8, 2019

(65) Prior Publication Data

US 2021/0043161 A1 Feb. 11, 2021

(51) Int. Cl.
*G09G 5/08* (2006.01)
*G06T 7/73* (2017.01)

(52) U.S. Cl.
CPC .............. *G09G 5/08* (2013.01); *G06T 7/74* (2017.01); *G06T 2207/10024* (2013.01); *G06T 2207/20021* (2013.01); *G06T 2207/20072* (2013.01)

(58) Field of Classification Search
CPC . G06T 7/74; G06T 7/194; G06T 2207/10024; G06T 2207/20021; G06T 2207/20072; G06K 9/38; G06K 9/62; G09G 5/08
See application file for complete search history.

(56) References Cited

U.S. PATENT DOCUMENTS

| 2004/0001044 A1* | 1/2004 | Luciani, Jr. ......... G06F 3/04812 345/157 |
| 2007/0288584 A1* | 12/2007 | Tsai ...................... G06F 3/1454 709/208 |
| 2010/0061658 A1* | 3/2010 | Yamada .................... G06T 7/11 382/282 |
| 2010/0080483 A1* | 4/2010 | Almbladh ................ G06T 1/20 382/260 |

(Continued)

*Primary Examiner* — Kenny A Cese
(74) *Attorney, Agent, or Firm* — Muncy, Geissler, Olds & Lowe, P.C.

(57) ABSTRACT

A cursor image detection comparison and feedback status determination method is disclosed. The method is based on a non-invasive data-extraction system architecture, and uses an image processing unit to perform detection comparison on a cursor image shown on an operation screen outputted from a machine controller. The method includes steps of obtaining cursor foreground and background images set by a user, and selecting an algorithm to process the cursor foreground and background images to generate a cursor mask, and reading a cursor image and applying the cursor mask on the cursor image for pattern comparison, transmitting information of a comparison result and a cursor feedback status to a software control system, so as to provide a correction system to perform a cursor process program and check whether the movement of the cursor meet a position controlled by a feedback and correction system, thereby completing closed-loop control for the cursor.

11 Claims, 12 Drawing Sheets

(56) References Cited

U.S. PATENT DOCUMENTS

| | | | |
|---|---|---|---|
| 2011/0242122 A1* | 10/2011 | Bose | G09G 5/08 |
| | | | 345/545 |
| 2012/0272179 A1* | 10/2012 | Stafford | G06F 3/038 |
| | | | 715/781 |
| 2013/0050275 A1* | 2/2013 | Miyamoto | G06F 3/04812 |
| | | | 345/672 |
| 2017/0200057 A1* | 7/2017 | Hyuga | G06K 9/38 |

* cited by examiner

CURSOR IMAGE DETECTION COMPARISON AND FEEDBACK STATUS DETERMINATION METHOD

BACKGROUND OF THE INVENTION

1. Field of the Invention

The present invention relates to a cursor image detection comparison and feedback status determination method, more particularly to a cursor image detection comparison and feedback status determination method which uses an image processing unit to read a cursor image of an operation screen of a machine and perform detection and comparison on the cursor image, and then provide information of a comparison result and a cursor feedback status to a correction system for sequential process, so as to complete closed-loop control for the cursor.

2. Description of the Related Art

In recent years, advancement of information technology, development of the Internet, substantial improvement of computing capabilities of computers, and the continuous improvement of data collection and storage technology accelerate accumulation, recording and acquisition of big data. Furthermore, industrial production machines also use the cloud to develop big data applications, and one of the important tasks is to collect data of the relevant machines disposed in a production line or a cloud end point. In general, important data is shown on a user interface of software of the machine, and an operator can perform a lot of screen manipulations on the user interface, so the operational behavior is helpful to understand data collection and analysis application, such as the machine data adjustment performed by the operator currently, data extraction of a machine program interface, and program parameter setting.

The user interface of the machine is generally a medium for interaction and information exchange between the system and the operator, and usually includes human-computer interaction and graphical user interface, so that the operator can use a data input device such as a keyboard, a mouse, or a touchpad, to transmit signals to control an operation screen of the machine, to operate the system of the machine. However, when the signal of the mouse is transmitted unidirectionally, it is easy to lose the signal because of resource limitation of the operating system to be operated, and the signal loss results in failure of properly operating the cursor of the mouse. Furthermore, when the old machine is to be upgraded, it has difficulty in hardware device expansion and software system modification, and during an operation of collecting the mouse control data on the old machine, the operational load of a processor of the old machine is affected easily and the resources on the computer are also limited by the programs and performance of the old machine. Furthermore, subject to trade secrets, confidentiality agreements in software and hardware, and computing resources, it is hard to install a mouse control feedback program in the system of the target machine based on an invasive data-extraction manner, and the speed of the cursor movement may be inconsistent because of different setting of the target machine, and it may cause an error in predicting the speed of the cursor movement. The above-mentioned factors are disadvantageous for collection of a large amount of data shown on the user interface of the old machine, and how to solve these problems is an important issue in the industry.

SUMMARY OF THE INVENTION

In order to solve the conventional problem that the conventional manner of collecting machine data may increase operational load of a processor of an old machine and may be hard to obtain a large amount of data shown on the user interface subject to limitation of system resource of the old type machine, the inventors develop a cursor image detection comparison and feedback status determination method according to collected data, multiple tests and modifications, and years of research experience.

An objective of the present invention is that, without intervening the target machine, a non-invasive data-extraction system can be used to detect a cursor image shown on the operation screen of a target machine while the mouse is actually controlled, and apply a cursor mask to perform pattern comparison and transmit information of a comparison result and a cursor feedback status to a software control system, so as to provide a correction system to perform corresponding process, thereby ensuring accuracy of the cursor movement which is controlled and transmitted, and completing the closed-loop control for the cursor. As a result, the manufacturing process and the operational load of the target machine can be prevented from being affected, and the feedback correction mechanism for controlling and monitoring the cursor can be provided for more correct and reliable information of the cursor position and more accurate machine control process when a central processor or an operating system allocates resource; furthermore, the user's operation flow or behavior can be recorded or an intermediate medium for extracting a large amount of user interface information can be provided.

Another objective of the present invention is that an image processing unit can perform comparison computation to provide information of at least one position and amount of the cursor and image stability, for designing a flow of obtaining and correcting a cursor position feedback status, and the flow can comprise operations of using a cursor foreground image and a cursor background image set by a user, applying a cursor mask, a care area and a don't-care area, obtaining a preset threshold value according to bins between brightness values of an image histogram on a horizontal axe, and using comparison unit to perform line scan comparison; furthermore, in a flow of determining the cursor feedback status, the image processing unit provides the comparison result for moving the cursor, and the flow can comprise operations of detecting stability of the cursor in entire design flow, determining multi-position situation, determining multiple cursors, analyzing previous movement of the cursor, and can comprise the recovery manner of moving the cursor back to a zero position and then to a target position, manner of using a safe area, cursor position compensation, error analysis, or other related cursor status detection.

Another objective of the present invention is that the image processing unit can detect the cursor image of the operation screen of the machine, for replacing the eye observation, and the field-programmable gate array (FPGA) can be used to execute the cursor image detection comparison process without using the central processor of the target machine, so as to reduce the operational load and ensure real-time image process; furthermore, the detection comparison result outputted from the image processing unit can be generated without obtaining setting parameters of the system of the target machine in advance, such as a moving speed of the cursor, so that the information of the feedback status such as the current position and number of the cursor and the image stability, can be correctly obtained according to coordinate records of the cursor controlled by a feedback and correction system, thereby providing a more accurate machine control process for a conventional non-invasive data-extraction system.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
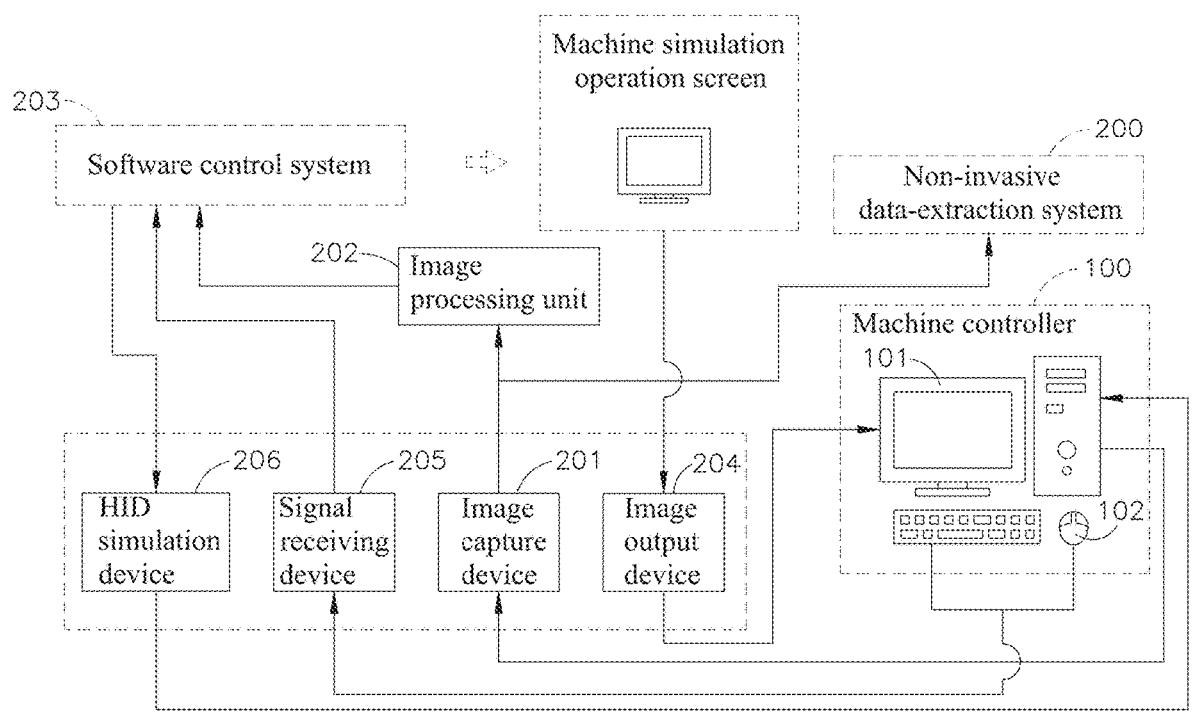
FIG. 1 is a system framework diagram of a non-invasive data-extraction system architecture for extracting data of a machine controller, according to the present invention.
Figure 2:
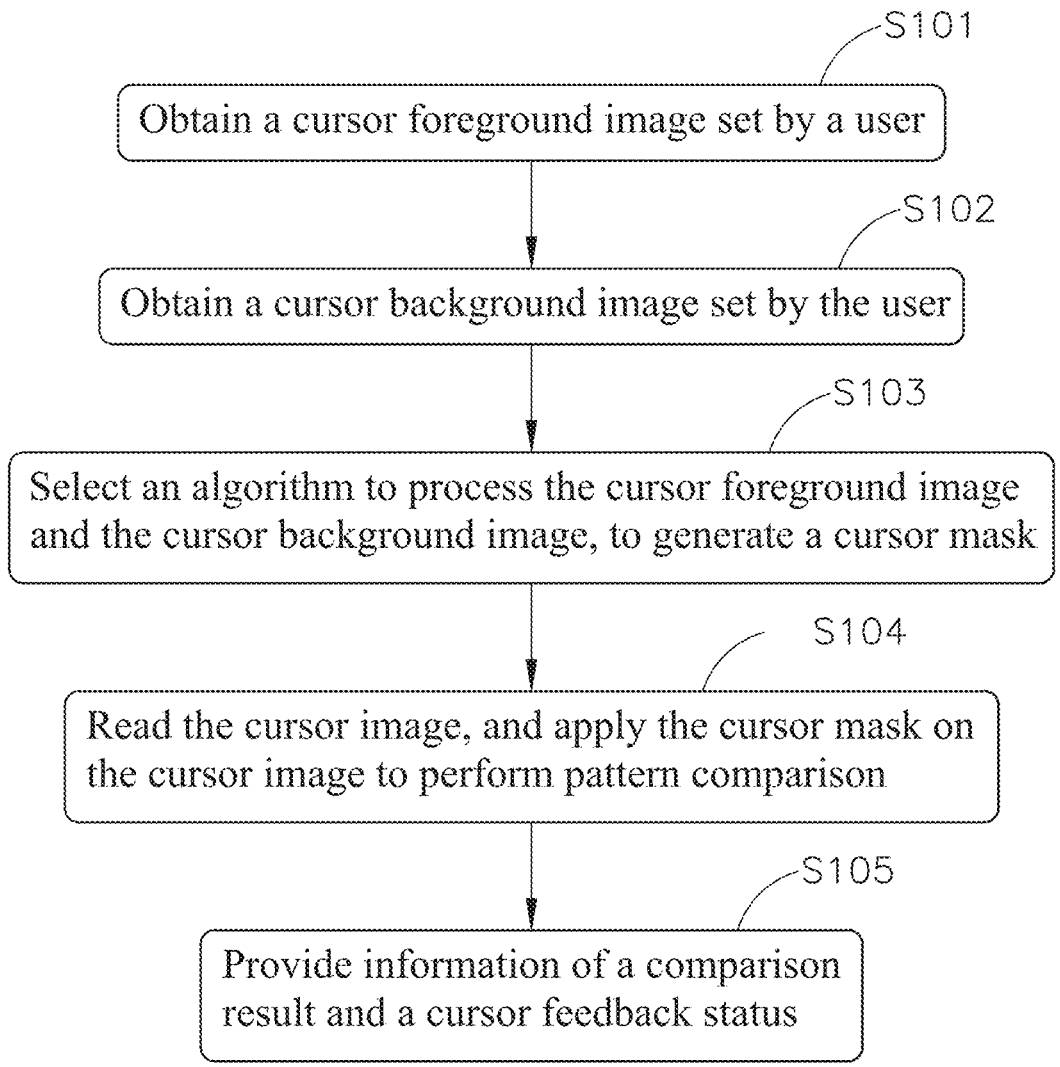
FIG. 2 is a flowchart of an operation of an image processing unit to perform cursor image detection comparison, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Please refer to FIG. 1, which is a system framework diagram of a non-invasive data-extraction system architecture for extracting data of a machine controller, according to the present invention. As shown in FIG. 1, a machine controller 100 of the present invention can be installed with a machine operation program which is able to generate an original operation screen for controlling the machine. Based on the architecture of the non-invasive data-extraction system 200, an image capture device 201 can be used to capture an image of the operation screen outputted from the machine controller 100, and transmit the image of the operation screen to the non-invasive data-extraction system 200 and an image processing unit 202 for extracting information shown on the operation screen, so that a software control system 203 can construct a machine simulation operation screen for an operator, and a customized operation interface can be added in the machine simulation operation screen. The machine simulation operation screen can be displayed on a screen 101 of the machine through an image output device 204. A signal receiving device 205 can be used to receive control signal of at least one of keyboard and mouse 102, and then transmit the control signal to the software control system 203 for processing, so that a HID simulation device 206 can simulate the keyboard/mouse 102 to transmit corresponding control signals to the machine controller 100.

In this embodiment, the image processing unit 202 can be a post-stage processing unit for processing the image of the operation screen captured by the image capture device 201, and the related image process algorithm can be implemented in a field-programmable gate array (FPGA), application-specific integrated circuit (ASIC), an application-specific standard product (ASSP), a microprocessor, or other chip, but not limited to physical level, and the related image process algorithm can be implemented by an application program or other intermediary software and hardware for high-speed image recognition, comparison, motion detection and cursor positioning. Furthermore, the machine connected to the machine controller 100 can be a machine or an apparatus disposed on a production line, a computer system, or an embedded system having a user interface. In an embodiment, the machine can comprise, but not limited to, a processing module, a memory or a communication module, and apply an operating system with graphic interface window, such as Windows, Linux, Unix or other operating system.

Please refer to FIGS. 2 to 7, which are flowchart of an operation of the image processing unit to perform cursor image detection comparison, a schematic view of an operation of applying the cursor mask on the cursor image shown on the operation screen, a flowchart of optimization process for the cursor mask, a schematic view of using threshold value to perform image binarization and area dilation on the cursor mask to demarcate an internal part of the arrowhead cursor, a schematic view of an operation of performing pixel padding on the I-shaped cursor in the X axis, a flowchart and a block diagram of the image processing unit reading the cursor image and performing pattern comparison to output a comparison result and determine a feedback status, according to the present invention, respectively. The image processing unit 202 can perform a detection comparison method on the cursor image shown on the operation screen, and the detection comparison method comprises steps S101 to S105.

In a step S101, a cursor foreground image set by a user is obtained.

In a step S102, a cursor background image set by the user is obtained.

In a step S103, a cursor contour extraction algorithm is selected to process the cursor foreground image and the cursor background image, so as to generate a cursor mask 300.

In a step S104, a comparison unit is used to read a cursor image, and apply the cursor mask 300 on the cursor image to perform pattern comparison.

In a step S105, the image processing unit 202 provides the information of the comparison result and the cursor feedback status.

According to above-mentioned contents, in the steps S101 and S102, the image processing unit 202 can obtain the cursor foreground image and the cursor background image preset by the user in the system, and a size of each of the cursor foreground image and the cursor background image can be 20×16 pixels which is a default value suggested by the system; however, the actual size of each of the cursor foreground image and the cursor background image can be adjusted upon user's requirement, and is not limited to above-mentioned example. The cursor background image is a part of the cursor foreground image other than the cursor image. In the step S103, a cursor contour extraction algorithm is performed on the cursor foreground image and the cursor background image to generate the cursor mask 300 for pattern comparison. In an embodiment, the cursor contour extraction algorithm can be a point extraction algorithm, a line extraction algorithm, a side extraction algorithm, a contour connection algorithm, or a corner extraction algorithm. The extraction algorithms can be expanded according to the complexity of the contents of the cursor foreground image and cursor background image preset by the user, or can be adjusted by the user according to the cursor mask 300 to be extracted, so as to improve the accuracy of cursor detection. The cursor mask 300 can comprise arrowhead and I-shaped cursor masks 300 divided from upper half and lower half images on a left side of FIG. 3, and white blocks (such as the parts formed by white pixels) in the arrowhead and I-shaped cursor masks 300 are defined as care areas 301, and the black blocks (such as the parts formed by black pixels) are defined as don't-care areas 302.

Figure 3:
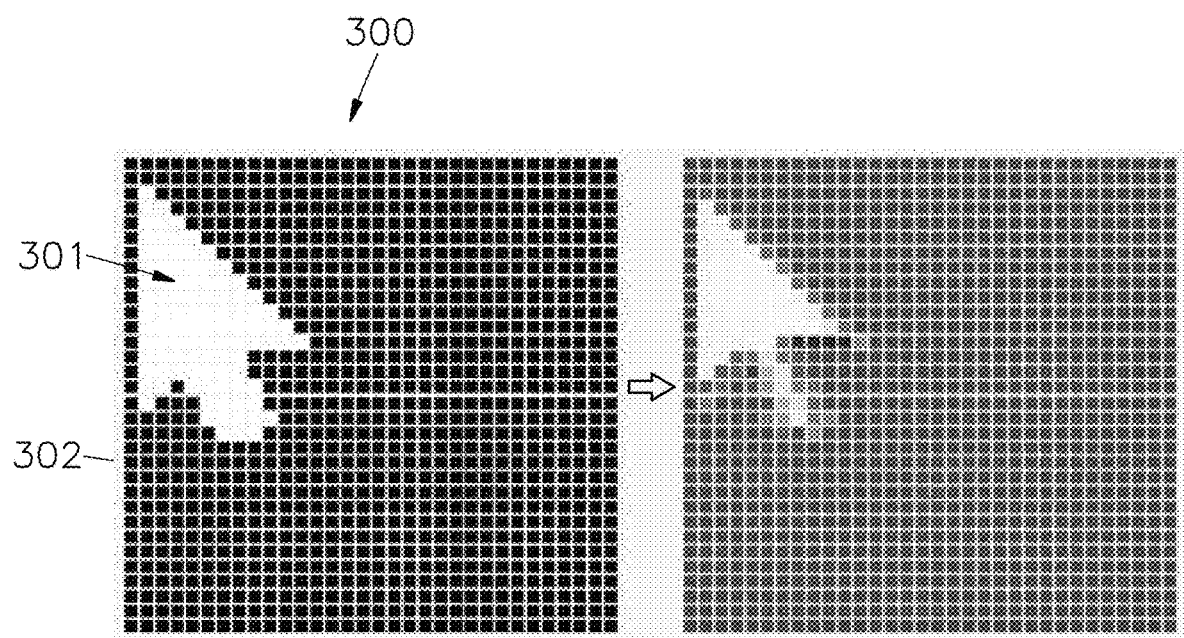
FIG. 3 is a schematic view of an operation of applying a cursor mask on a cursor image shown on an operation screen, according to the present invention.
Figure 3:
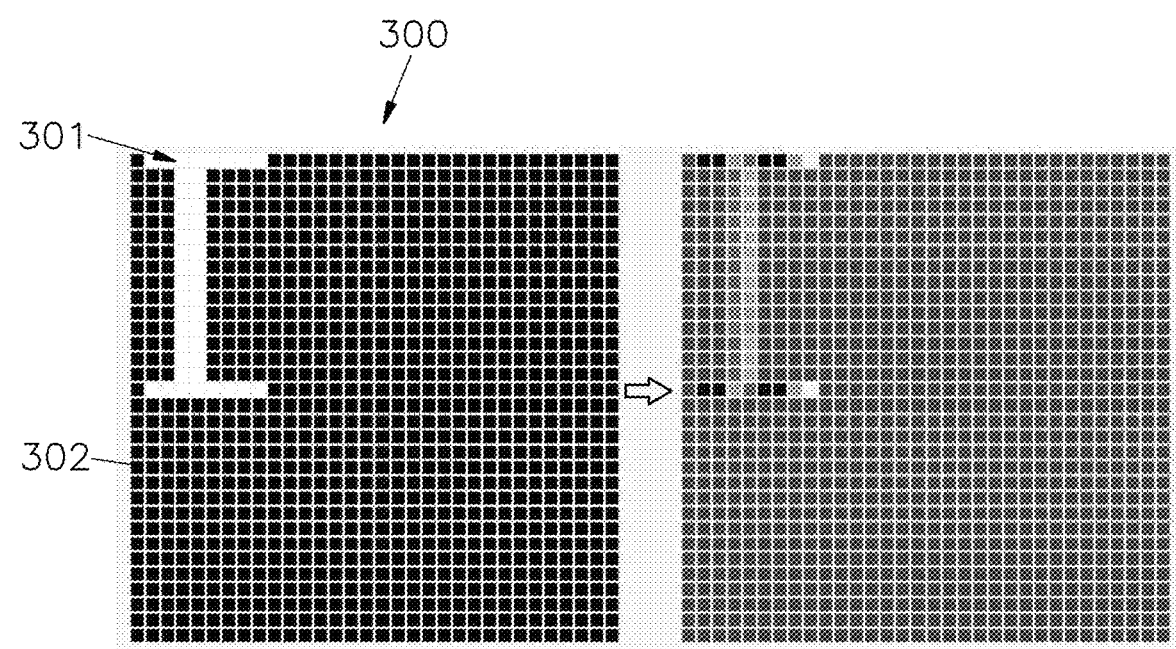

In the step S104, when the image processing unit 202 receives the image of the original operation screen of the target machine transmitted from the image capture device 201, the comparison unit of the image processing unit 202 can read the cursor image shown on the operation screen and apply the cursor mask 300 on the cursor image to perform pattern comparison; for example, the upper half and lower half images on a right side of FIG. 3 can indicate a preview result of an operation of applying the left arrowhead and I-shaped cursor masks 300 on the cursor image, respectively, and the cursor mask 300 including the don't-care areas 302 and the care areas 301.

Figure 4:
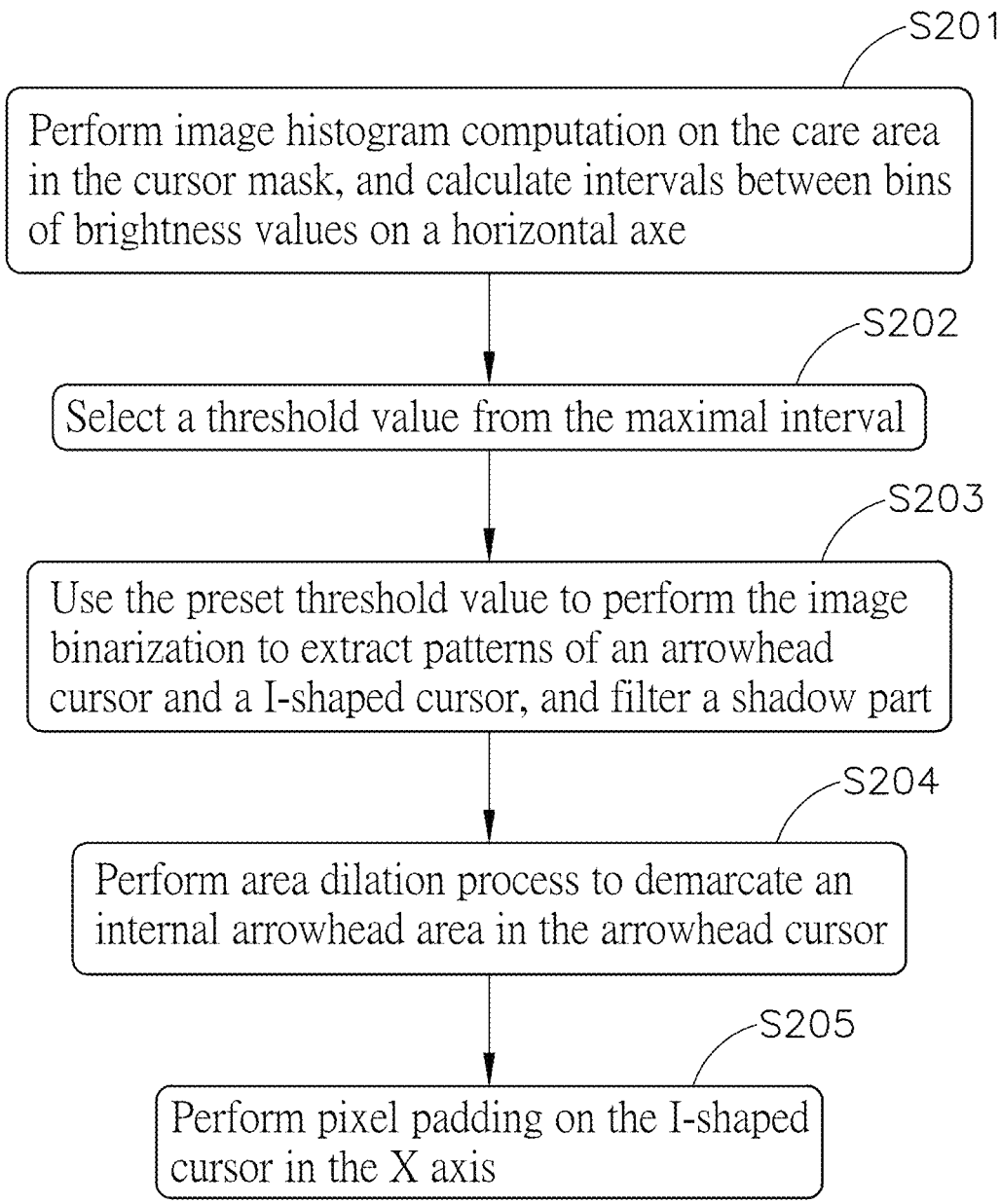
FIG. 4 is a flowchart of an operation of performing an optimization process on a cursor mask, according to the present invention.

As shown in FIG. 4, the comparison unit can perform an optimization process on the cursor mask 300 before performing the pattern comparison on the cursor image, and the optimization process comprises steps S201 to S205.

In a step S201, the image histogram computation is performed on the care area 301 of the cursor mask 300, to calculate intervals between bins of the brightness values on a horizontal axe.

In a step S202, among the calculated intervals, a threshold value is selected from the maximal interval.

In a step S203, the image binarization is performed based on the preset threshold value to extract the patterns of the arrowhead cursor 303 and the I-shaped cursor 304, and filter out shadow parts 305.

In a step S204, the area dilation is performed to demarcate the internal arrowhead area of the arrowhead cursor 303.

In a step S205, the pixel padding is performed on the I-shaped cursor 304 in the X axis.

Figure 5A:
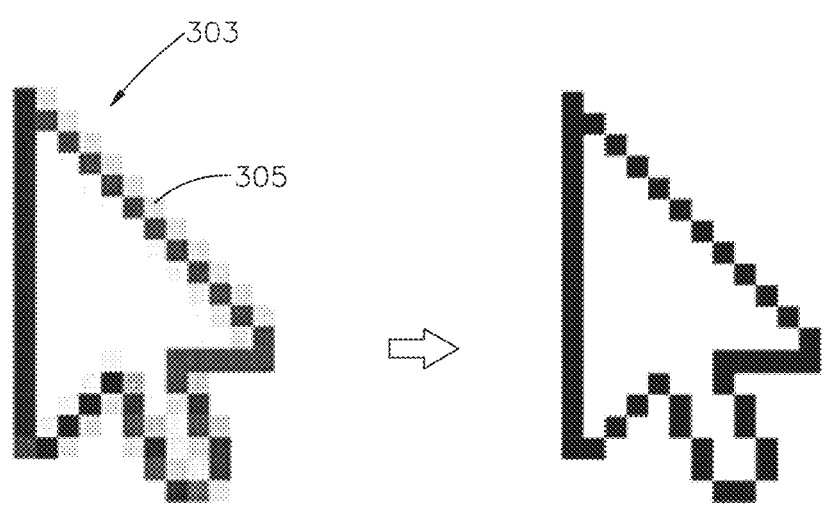
FIG. 5A is a schematic view of an operation of using a threshold value to perform image binarization and area dilation on a cursor mask to demarcate an internal part of an arrowhead cursor, according to the present invention.
Figure 5B:
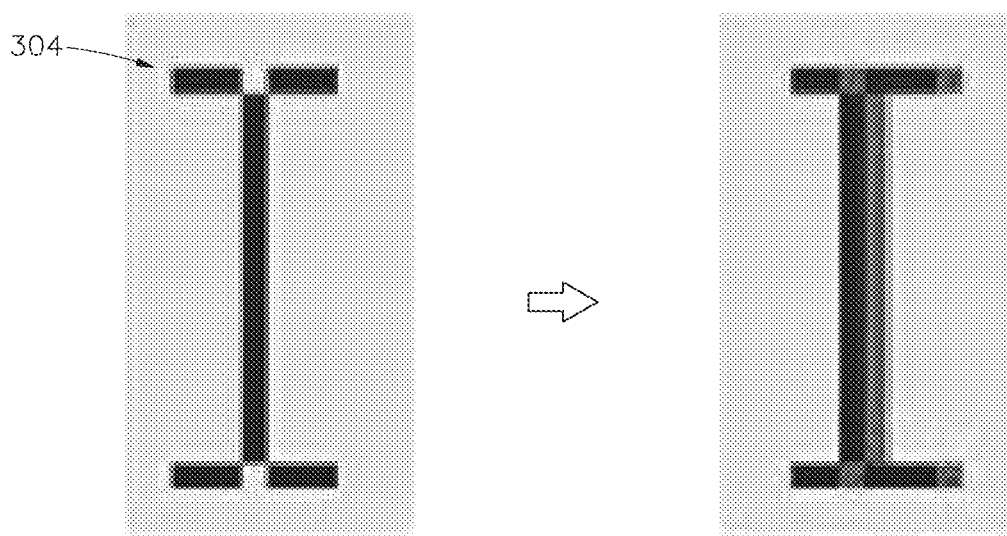
FIG. 5B is a schematic view of an operation of performing pixel padding on a I-shaped cursor in the X axis, according to the present invention.

According to above-mentioned contents, the image processing unit 202 can perform image histogram computation on the care area 301 of the cursor mask 300, and calculate the numbers of the pixels corresponding to each of brightness values (such as grayscale values or color values) of the care area 301. For example, each pixel of the care area 301 can have a brightness value in range of 0 (black) to 255 (white), wherein the values of 0 to 255 on the horizontal axe indicate different grayscale values, and each value on the vertical axe indicates a ratio of the pixels having certain grayscale value to all pixels of the care area 301, so that it can determine how to adjust the brightness distribution. Next, the intervals of the bins of brightness values of the image histogram on the horizontal axe are calculated, and a threshold value is selected from the maximal interval among all calculated intervals. The preset threshold value can be used to perform the image binarization to set each of the grayscale values of the pixels as 0 or 255, so that the processed image becomes a black-and-white image. In general, the pixels having the grayscale values exceeding the preset threshold value are defined as the cursor background image, and the pixels having the grayscale values not exceeding the preset threshold value are defined as the cursor foreground image, and the cursor background image is removed from the cursor image to extract the patterns of the arrowhead cursor 303 and the I-shaped cursor 304. Next, after the shadow parts 305 of the cursor pattern are filtered out, the area dilation process can be performed to demarcate the internal arrowhead area of the arrowhead cursor 303, and the pixel padding process can be performed on the I-shaped cursor 304 in the X axis, as shown in FIGS. 5A and 5B.

Figure 6:
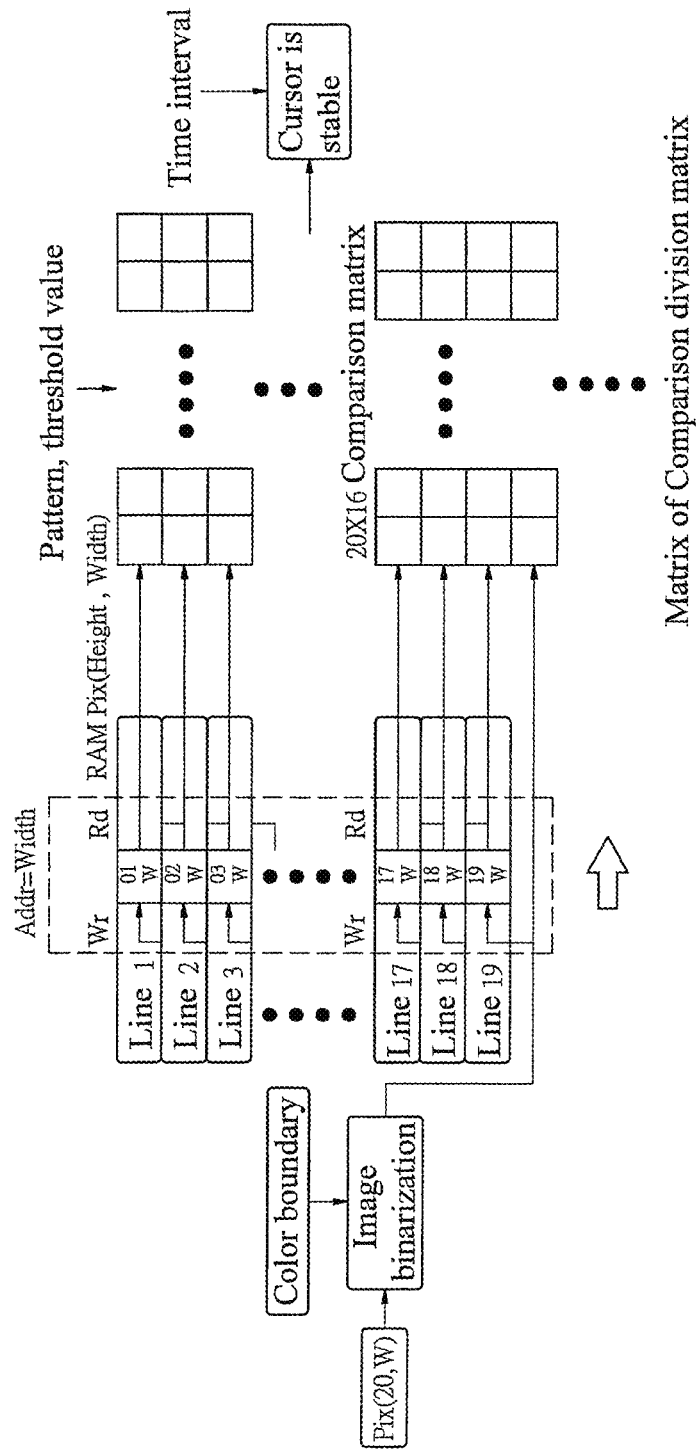
FIG. 6 is a flowchart of an operation of an image processing unit to read cursor image and perform pattern comparison to output a comparison result and determine a feedback status, according to the present invention.
Figure 7:
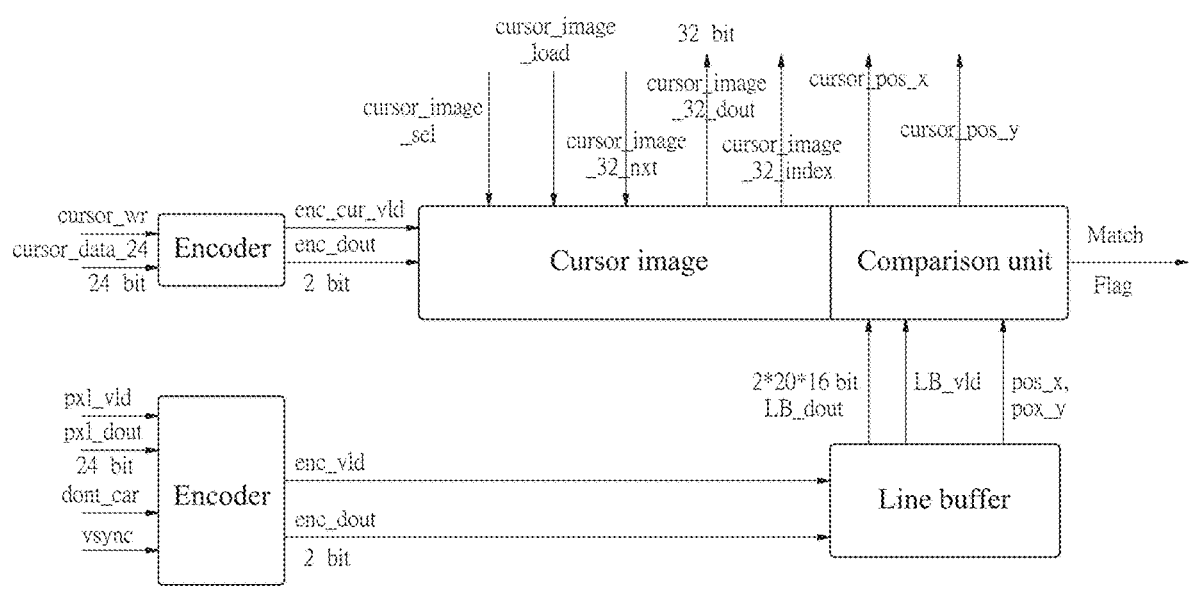
FIG. 7 is a block diagram of the image processing unit for reading the cursor image and performing pattern comparison to output a comparison result and determine a feedback status through, according to the present invention.

As shown in FIGS. 6 and 7, the image processing unit 202 can use the comparison unit to read the cursor image of the original operation screen of the machine, for example, the image with a size of Pix(20, W) has 20 pixels in the horizontal axis thereof and W pixels in the longitudinal axis thereof. Next, the cursor mask 300 can be applied on the cursor image, and the image process and related algorithm are performed to divide the cursor image through color boundary and the image binarization, and after the cursor image is scanned line by line, the pattern comparison can be performed on the matrix of the division patterns, to calculate and obtain score distribution as shown in table 1 below. For example, the score distribution for a comparison matrix of 20×16 can be from 1 to 320. According to the score threshold value and experiment results, a determination score for determining whether the cursor image is stable can be determined. As shown in the table 1, the score threshold value indicating a stable arrowhead cursor image is in a range of 302 to 314, and the score threshold value indicating a I-shaped cursor image is in a range of 314 to 316. The image processing unit 202 can perform pattern comparison on the cursor image, and transmit the information of the comparison result to the software control system 203 for analysis, and also provide the information of the position and amount of the cursor shown on the operation screen, and image stability, so as to check whether the movement of the cursor meets the position controlled by the feedback and correction system.

Furthermore, after the comparison unit of the image processing unit 202 reads the cursor image, an encoder can encode the cursor image into an image of 20×16 pixels the same as that of the cursor mask 300, and the image data of the cursor mask 300 is stored in a line buffer, the image data of the cursor mask 300 is sequentially written into the comparison unit by different rates, so that the comparison unit can apply the cursor mask 300 on the cursor image for performing pattern comparison by line scan comparison, so as to calculate the score of the cursor.

Table 1 shows a comparison result

| Score | Output # Result | Threshold Description |
|---|---|---|
| 320 | 0 | The score is too high |
| 319 | 0 | |
| ... | ... | |
| 316 | 0 | |
| 315 | 0 | |
| 314 | 1 | The score is medium |
| 313 | 1 | |
| ... | ... | |
| 302 | 1 | |
| 301 | 2 | The score is too low |
| 300 | 2 | |
| ... | ... | |
| 1 | 2 | |

Figure 8A:
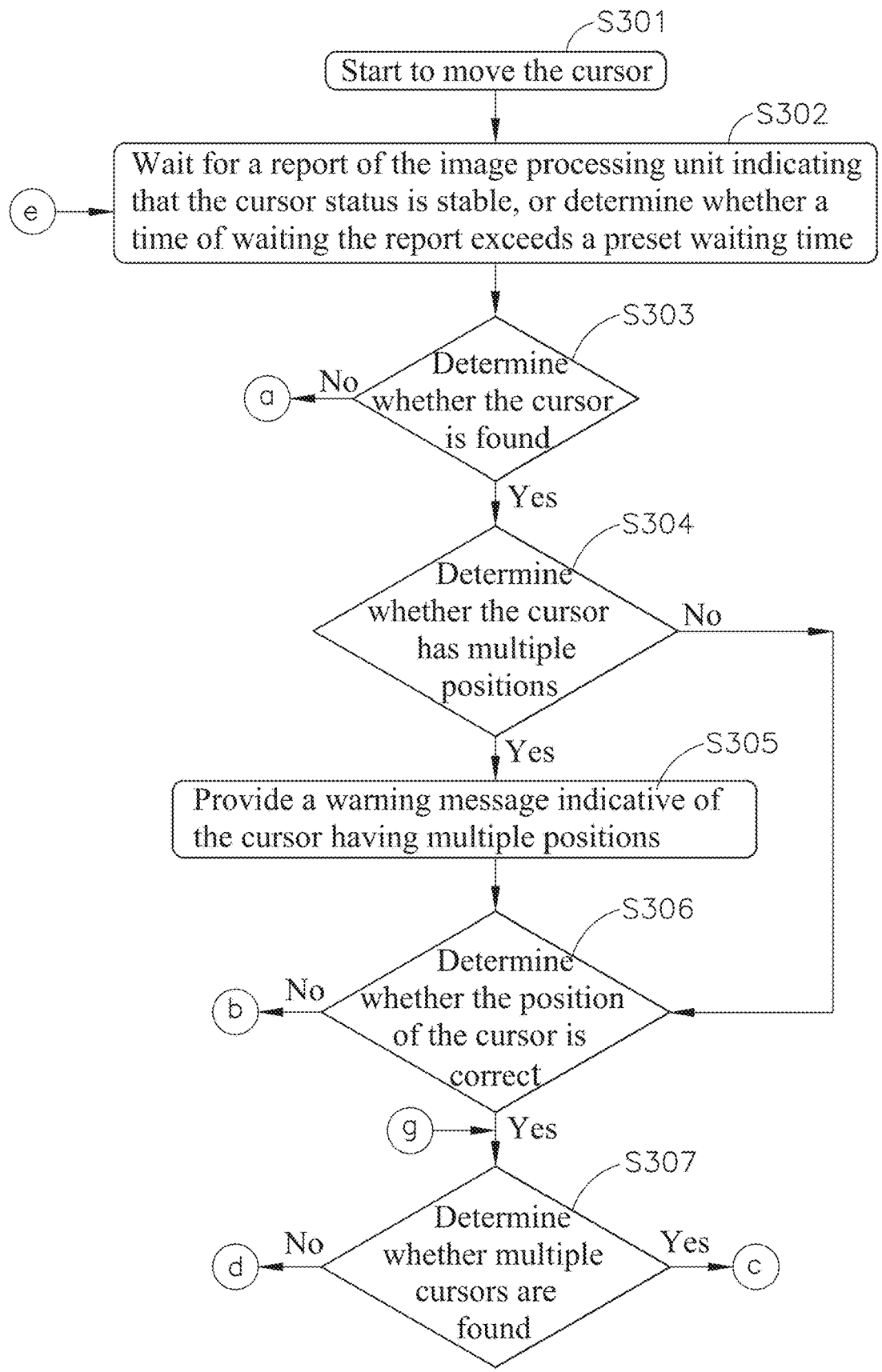
FIG. 8A is a first flowchart of an operation of an image processing unit to determine a cursor feedback status, according to the present invention.
Figure 8B:
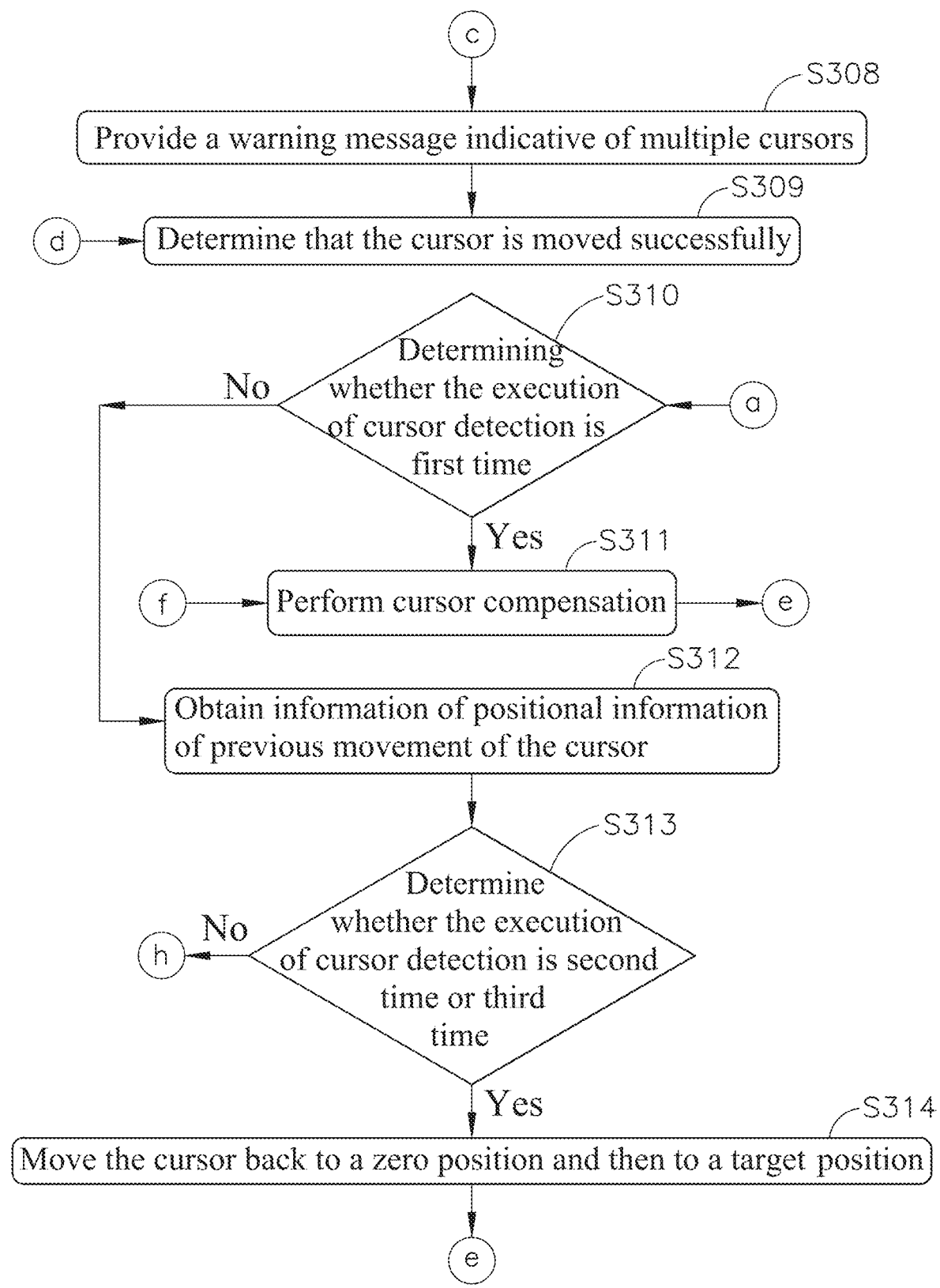
FIG. 8B is a second flowchart of the operation of the image processing unit to determine the cursor feedback status, according to the present invention.
Figure 8C:
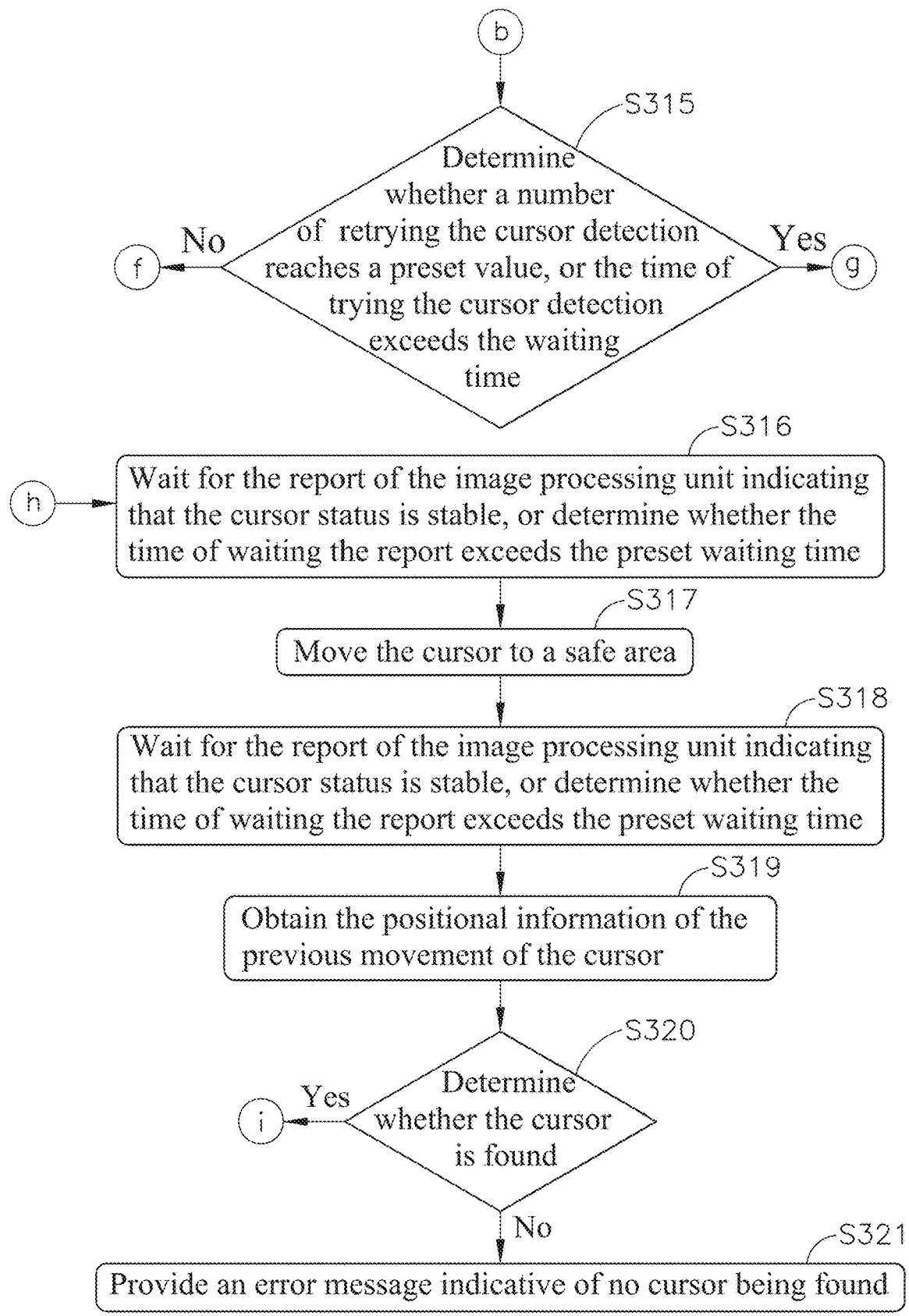
FIG. 8C is a third flowchart of an operation of the image processing unit to determine the cursor feedback status, according to the present invention.
Figure 8D:
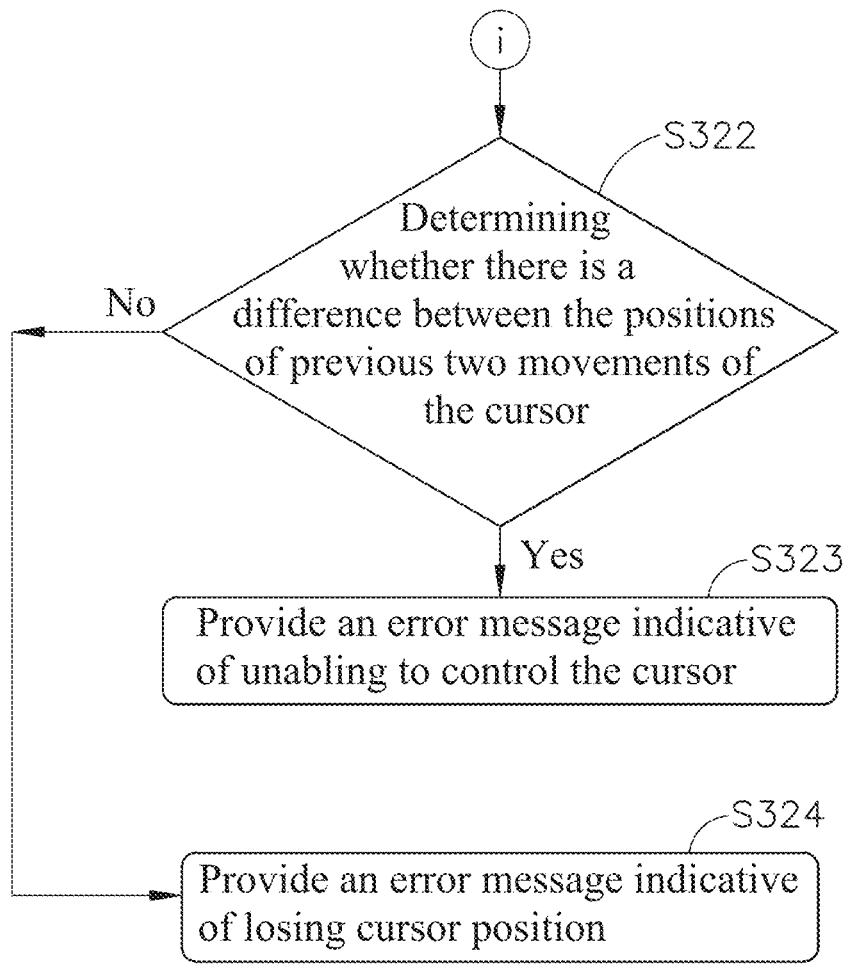
FIG. 8D is a fourth flowchart showing an operation of the image processing unit to determine the cursor feedback status, according to the present invention.

Please refer to FIGS. 8A and 8D, which shows first to fourth flowcharts of operations of the image processing unit to determine the cursor feedback status, respectively. The image processing unit 202 performs the cursor feedback status determination method including steps S301 to S324, In a step S301, the system starts to move the cursor.

In a step S302, after a report of the image processing unit 202 indicating that the cursor status is stable is received or the time of waiting the repot exceeds a preset waiting time, the determination method then executes step S303.

In a step S303, it is determined whether the cursor is found, and when the cursor is found, the determination method then executes step S304; otherwise, the determination method executes step S310.

In a step S304, it is determined whether the found cursor has multiple positions, and when the found cursor has multiple positions, the determination method executes step S305; otherwise, the determination method executes step S306.

In a step S305, a warning message indicative of multiple positions of the cursor is provided, and the determination method then executes step S306.

In a step S306, it is determined whether the position of the found cursor is correct, when the position of the found cursor is correct, the determination method executes step S307; otherwise, the determination method executes step S315.

In a step S307, it is determined whether multiple cursors are found, and when multiple cursors are found, the determination method executes step S308; otherwise, the determination method executes step S309.

In a step S308, a warning message indicative of multiple cursors is provided, and the determination method executes step S309.

In a step S309, it is determined that the movement of the cursor is detected successfully.

In a step S310, it is determined whether the execution of the cursor determination is first time, and when the execution of the cursor determination is first time, the determination method executes step S311; otherwise, the determination method executes step S312.

In a step S311, the cursor compensation process is performed, and the determination method then executes step S302.

In a step S312, the positional information of the previous movement of the cursor is obtained, and the determination method then executes step S313.

In a step S313, it is determined whether the execution of the cursor determination is second time or third time, when the execution of the cursor determination is second time or third time, the determination method executes step S314; otherwise, the determination method executes step S316.

In a step S314, the cursor is moved back to a zero position and then to a target position, and the determination method then executes the step S302.

In a step S315, it is determined whether the number of retrying cursor detection reaches a preset value, or the period of retrying cursor detection exceeds the waiting time, and if so, the determination method executes step S307; otherwise, the determination method executes step S311.

In a step S316, after a report of the image processing unit 202 indicating that the cursor status is stable is received or the time of waiting the report exceeds the preset waiting time, the determination method executes step S317.

In a step S317, the cursor is moved to a safe area, and the determination method then executes step S318.

In a step S318, after the report of the image processing unit 202 indicating that the cursor status is stable is received or the time of waiting the report exceeds the preset waiting time, the determination method executes step S319.

In a step S319, the positional information of the previous movement of the cursor is obtained, and the determination method then executes step S320.

In a step S320, it is determined whether the cursor is found, when no cursor is found, the determination method executes step S321; otherwise, the determination method executes step S322.

In a step S321, an error message indicative of no cursor being found is provided.

In a step S322, it is determined whether there is a difference between the positions of the cursor in two movements, and when there is a difference between the positions of the cursor in two movements, the determination method executes step S323; otherwise, the determination method executes step S324.

In a step S323, an error message indicative of unabling to control the cursor is provided.

In a step S324, an error message indicative of losing the cursor position is provided.

According to above-mentioned contents, when the operator controls the keyboard or the mouse of the target machine, the system starts move the cursor, and the image processing unit 202 can detect the cursor image of the operation screen outputted from the machine controller 100, and transmit the information (such as information of position, number, image stability and score) of the comparison result of the cursor image to the software control system 203 for analysis, so as to complete the closed-loop control for the cursor. The software control system 203 executes the movement of the cursor, and after the software control system 203 receives the report of the image processing unit 202 to indicate the cursor status is stable already or the time of waiting for the report exceeds the preset waiting time, the software control system 203 can determine whether the cursor is found. When the cursor is found, the determination for multi-position of the cursor is performed, and when the multi-position of the cursor exists, the image processing unit 202 provides the warning message indicative of multiple positions of the cursor to the software control system 203, and the determination for correction of the position of the cursor is then performed, and when the position of the cursor is correct, the determination of multiple cursor is performed. When there are multiple cursors, the image processing unit 202 provides the warning message indicative of multiple cursors to the software control system 203, and determines that the cursor is moved successfully. As a result, the movement of the cursor is completed.

Furthermore, in the step of determining whether the cursor is found, when no cursor is found, the step of determining whether this execution of the cursor detection is first time is performed. When this execution of the cursor detection is a first time execution, the feedback and correction system performs the cursor compensation and then executes the step of waiting for the image processing unit 202 to report that the cursor status is stable already or determining whether the time of waiting the report exceeds the preset waiting time already. When this execution of the cursor detection is not the first time execution, the positional information of the previous movement of the cursor executed by the system is obtained, and it is determined whether this execution of the cursor detection is second time or third time. When this execution of the cursor detection is second time or third time, the cursor is moved back to the zero position and then moved to the target position, and the determination method returns back to the step of waiting for the image processing unit 202 to report that the cursor status is stable already or determining whether the time of waiting the report exceeds the preset waiting time already.

Furthermore, in the step of determining whether the position of the cursor is correct, when the position of the cursor is not correct, the determination method then enters the step of determining whether the number of retrying the cursor detection reaches the preset value or the period of retrying cursor detection exceeds the preset waiting time, and when the number of retrying the cursor detection reaches the preset value or the period of retrying detection exceeds the preset waiting time, the determination method enters the step of determining multi-cursor; otherwise, the determination method executes the step of performing the cursor compensation and then execute the step of waiting for the image processing unit 202 to report that the cursor status is stable or determining whether the time of waiting the report exceeds the preset waiting time already.

Furthermore, in the step of determining whether this execution of cursor detection is second time or third time, when this execution of cursor detection is determined not second time or third time, the cursor error analysis is executed. When the software control system 203 executes the error analysis process, the software control system 203 first waits for the image processing unit 202 to report that the cursor status is stable already or determines whether the time of waiting the report exceeds the preset waiting time, and then moves the cursor to the safe area, and executes the step of waiting for the image processing unit 202 to report that the cursor status is stable already or determining whether the time of waiting the report exceeds the preset waiting time, and then obtains positional information of the movement of the cursor executed last time, and then determines whether the cursor is found. When no cursor is found, the image processing unit 202 provides the error message indicative of unabling to detect the cursor to the software control system 203. When the cursor is found, the determination method enters the step of determining whether there is difference between the positions of current movement and previous movement of the cursor, and when there is an difference, the image processing unit 202 provides the error message of unabling to control the cursor; otherwise, when there is no difference, the image processing unit 202 provides the error message indicative of losing the cursor position, thereby providing the detection feedback and correction system to perform corresponding process.

Therefore, based on the architecture of the non-invasive data-extraction system 200 and without intervening the manufacturing machine, the cursor image detection comparison and feedback status determination method of the present invention can use the image processing unit 202 to read the cursor image of the operation screen actually controlled by the keyboard/mouse 102 of the machine controller 100 and apply the cursor mask 300 and perform the pattern comparison on the cursor image. After the pattern comparison, the information of at least one position and the number of the cursor and image stability can be provided for designing the cursor position feedback status and correction flow. The flow of detection comparison comprises the step of using the cursor foreground and background images set by user, such as the manner of obtaining the foreground and background images, generating the cursor mask 300 and regulating the cursor pattern, and the step of using the cursor mask 300 to perform pattern comparison, using the care area 301 and the don't-care area 302, and obtaining the preset threshold value from the intervals between bins of the brightness values of the image histogram on the horizontal axe, using the comparison unit to perform the line scan comparison; furthermore, the flow of determining cursor feedback status includes the step of moving the cursor according to the comparison result provided by the image processing unit 202, and the steps of determining the stability of detecting the cursor, analyzing multi-position of the cursor, multiple cursors, previous movement of cursor or other related cursor status, and using the recovery manner of moving the cursor back to the zero position and to the target position again, and manner of using the safe area, and the step of performing the cursor position compensation and error analysis.

Compared with the conventional technology, the cursor image detection comparison and feedback status determination method of the present invention has beneficial effects below.

First, in the method of the present invention, the image processing unit 202 can transmit the feedback result indicating the detection comparison of the cursor image of the operation screen of the target machine, so as to provide the correction system to perform corresponding cursor program.

Secondly, the detection comparison flow for the cursor image executed by the image processing unit 202 of the present invention can be processed by FPGA, instead of using the central processor of the system host of the target machine, so that the operational load of the central processor can be reduced and the real-time image process can be ensured.

Thirdly, in the method of the present invention, the image processing unit 202 can detect the cursor image of the operation screen of the target machine, to check whether the movement of the cursor meets the position controlled by the feedback and correction system, so as to complete the closed-loop control for the cursor and replace the conventional eye observation.

Fourthly, in the method of the present invention, the result of the detection comparison transmitted from the image processing unit 202, and the coordinate record of the position of the cursor of the feedback and correction system can be used to provide more accurate machine control process to the conventional non-invasive data-extraction system.

Fifthly, in the method of the present invention, the image processing unit 202 can correctly and instantly obtain the feedback status information about the current position and number of the cursor and the image stability, without obtaining the setting parameters of the system of the target machine, such as moving speed of the cursor.

Sixthly, in the method of the present invention, the image processing unit 202 can provide the cursor feedback status information to record the user operational flow and behavior, or serve as intermediate medium for extracting a large quantity of user interface information, for data collection, analysis and application.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A cursor image detection comparison and feedback status determination method, based on a non-invasive data-extraction system architecture, and using an image processing unit to read a cursor image of an operation screen outputted by a machine controller and perform detection and comparison on the cursor image, and the cursor image detection comparison and feedback status determination method comprising:
(A): obtaining a cursor foreground image set by a user;
(B): obtaining a cursor background image set by the user;
(C): selecting an algorithm to process the foreground image and the background image, to generate a cursor mask;
(D): reading the cursor image, and apply the cursor mask on the cursor image to perform pattern comparison; and
(E): providing information of a comparison result and a cursor feedback status,
wherein the step (E) of using the image processing unit to provide the cursor feedback status, further comprises:
(E01): starting to move the cursor;
(E02): waiting for a report of the image processing unit indicating that the cursor status is stable, or determining whether a time of waiting the report exceeds a preset waiting time;
(E03): determining whether the cursor is found, and when the cursor is found, executing a step (E04), and when no cursor is found, executing a step (E10);
(E04): determining whether the cursor has multiple positions, and when the cursor has multiple positions, executing a step (E05), otherwise, executing a step (E06);
(E05): providing a warning message indicative of the cursor having multiple positions, and executing a step (E06);
(E06): determining whether the position of the cursor is correct, and when the position of the cursor is correct, executing a step (E07), otherwise, executing a step (E15);
(E07): determining whether multiple cursors are found, and when multiple cursors are found, executing a step (E08), otherwise, executing a step (E09);
(E08): providing a warning message indicative of multiple cursors, and executing a step (E09);
(E09): determining that the cursor is moved successfully;
(E10): determining whether the execution of cursor detection is first time, and when the execution of cursor detection is first time, executing a step (E11), otherwise, executing a step (E12);
(E11): performing cursor compensation, and executing the step (E02);
(E12): obtaining information of positional information of previous movement of the cursor, and executing a step (E13);
(E13): determining whether the execution of cursor detection is second time or third time, and when the execution of cursor detection is second time or third time, executing a step (E14), otherwise, executing a step (E16);
(E14): moving the cursor back to a zero position and then to a target position, and executing the step (E02);
(E15): determining whether a number of retrying the cursor detection reaches a preset value, or the time of trying the cursor detection exceeds the waiting time, and if yes, executing the step (E07), otherwise, repeating the step (E11);
(E16): waiting for the report of the image processing unit indicating that the cursor status is stable, or determining whether the time of waiting the report exceeds the preset waiting time, and executing a step (E17);
(E17): moving the cursor to a safe area, and executing a step (E18);
(E18): waiting for the report of the image processing unit indicating that the cursor status is stable, or determining whether the time of waiting the report exceeds the preset waiting time, and executing a step (E19);
(E19): obtaining the positional information of the previous movement of the cursor, and executing a step (E20);

(E20): determining whether the cursor is found, and when no cursor is found, executing a step (E21), otherwise, executing a step (E22);
(E21): providing an error message indicative of no cursor being found;
(E22): determining whether there is a difference between the positions of previous two movements of the cursor, and when there is a difference between the positions of the previous two movements of the cursor, executing a step (E23), otherwise, executing a step (E24);
(E23): providing an error message indicative of being unable to control the cursor; and
(E24): providing an error message indicative of losing cursor position.

2. The cursor image detection comparison and feedback status determination method according to claim 1, wherein the image processing unit is a field-programmable gate array (FPGA), an application-specific integrated circuit (ASIC), a microprocessor or an application program.

3. The cursor image detection comparison and feedback status determination method according to claim 1, wherein the image processing unit obtains the foreground image and the background image from a system in which the user sets the cursor foreground image and the cursor background image.

4. The cursor image detection comparison and feedback status determination method according to claim 1, wherein the foreground image and the background image is processed by a cursor contour extraction algorithm to generate the cursor mask, and the cursor mask comprises an arrowhead mask and a I-shaped cursor mask.

5. The cursor image detection comparison and feedback status determination method according to claim 1, wherein the image processing unit uses a comparison unit to read the cursor image, and apply the cursor mask to divide the cursor image into a care area and a don't-care area, and then perform the pattern comparison.

6. The cursor image detection comparison and feedback status determination method according to claim 5, further comprising a step of performing an optimization process on the cursor mask before the step (D) of applying the cursor mask, wherein the optimization process comprises:
(D1): performing image histogram computation on the care area in the cursor mask, and calculating intervals between bins of brightness values on a horizontal axe;
(D2): selecting a threshold value from the maximal interval among the calculated intervals;
(D3): using the preset threshold value to perform an image binarization to extract patterns of an arrowhead cursor and a I-shaped cursor, and filtering a shadow part;
(D4): performing area dilation process to demarcate an internal arrowhead area in the arrowhead cursor; and
(D5): performing pixel padding on the I-shaped cursor in the X axis.

7. The cursor image detection comparison and feedback status determination method according to claim 6, wherein the horizontal axe of the image histogram indicates different brightness values of pixels of the care area, and the vertical axe of the image histogram indicates ratios of the pixels having the different brightness values to the all pixels of the care area.

8. The cursor image detection comparison and feedback status determination method according to claim 7, wherein after the image binarization, the pixels having the brightness values exceeding the preset threshold value are defined as the background image, and the pixels having the brightness values not exceeding the preset threshold value are defined as the foreground image, and the background image is removed from the cursor image to extract the patterns of an arrowhead cursor and a I-shaped cursor.

9. The cursor image detection comparison and feedback status determination method according to claim 5, wherein the comparison unit performs an image binarization and color boundary detection on the care area of the cursor mask to divide the cursor image, and scan the cursor image line by line, and perform division pattern matrix calculation to obtain a score threshold value for determining whether the cursor image is stable.

10. The cursor image detection comparison and feedback status determination method according to claim 1, wherein the information of the comparison result of the step (E) comprises a position and a number of the cursor on the operation screen, image stability, and is used to check whether the movement of the cursor meets a position controlled by a feedback and correction system.

11. The cursor image detection comparison and feedback status determination method according to claim 1, wherein in the step (E), the image processing unit provides the cursor feedback status to a software control system, so that a detection feedback and correction system performs corresponding process.

* * * * *